US007076681B2

(12) United States Patent
Bose et al.

(10) Patent No.: US 7,076,681 B2
(45) Date of Patent: Jul. 11, 2006

(54) PROCESSOR WITH DEMAND-DRIVEN CLOCK THROTTLING POWER REDUCTION

(75) Inventors: Pradip Bose, Yorktown Heights, NY (US); Daniel M. Citron, Riverdale, NY (US); Peter W. Cook, Mount Kisco, NY (US); Philip G. Emma, Danbury, CT (US); Hans M. Jacobson, White Plains, NY (US); Prabhakar N. Kudva, New York, NY (US); Stanley E. Schuster, Granite Springs, NY (US); Jude A. Rivers, Cortlandt Manor, NY (US); Victor V. Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 10/187,698

(22) Filed: Jul. 2, 2002

(65) Prior Publication Data

US 2004/0044915 A1 Mar. 4, 2004

(51) Int. Cl.
*G06F 1/04* (2006.01)
(52) U.S. Cl. ...................... 713/600; 713/320
(58) Field of Classification Search ................ 713/400, 713/600, 323; 712/23
See application file for complete search history.

(56) References Cited

U.S. PATENT DOCUMENTS

| 5,452,434 | A  | * | 9/1995  | MacDonald ........... 713/601 |
| 5,799,199 | A  | * | 8/1998  | Ito et al. ............ 713/324 |
| 5,987,620 | A  | * | 11/1999 | Tran ................. 713/600 |
| 6,233,690 | B1 | * | 5/2001  | Choi et al. ........... 713/322 |
| 6,247,134 | B1 |   | 6/2001  | Sproch et al. |
| 6,317,839 | B1 | * | 11/2001 | Wells ................ 713/320 |
| 6,609,209 | B1 | * | 8/2003  | Tiwari et al. ......... 713/322 |
| 6,611,920 | B1 | * | 8/2003  | Fletcher et al. ....... 713/322 |
| 6,651,176 | B1 | * | 11/2003 | Soltis et al. ......... 713/300 |
| 6,851,068 | B1 | * | 2/2005  | Jochiong et al. ....... 713/330 |
| 2002/0069348 | A1 | * | 6/2002  | Roth et al. .......... 712/219 |
| 2002/0104032 | A1 | * | 8/2002  | Khurshid et al. ...... 713/322 |
| 2002/0188828 | A1 | * | 12/2002 | Sugimoto ............ 712/215 |

OTHER PUBLICATIONS

Gowan, M., Biro, L. and Jackson, D. "Power Considerations in the Design of the Alpha 21264 Microprocessor" *Proc. ACM/IEEE Design Automation Conference* (Jun. 1998), pp. 726-731.

Ohnishi, M., Yamada, A., Noda, H. and Kambe, T. "A Method Of Redundant Clocking Detection And Power Reduction At The RT Level Design," *Proc. Int'l. Symp. On Low Power Electronics and Design (ISLPED)*, 1997, pp. 131-136.

Gerosa et al., "A 2.2 W, 80 MHz, Superscalar RISC Microprocessor," *IEEE Journal of Solid State Circuits*, vol. 29, No. 12, Dec. 1994, pp. 1440-1454.

* cited by examiner

*Primary Examiner*—Chun Cao
(74) *Attorney, Agent, or Firm*—Law Office of Charles W. Peterson, Jr.; Louis J. Percello, Esq.; Satheesh K. Karra, Esq.

(57) ABSTRACT

A synchronous integrated circuit such as a scalar processor or superscalar processor. Circuit components or units are clocked by and synchronized to a common system clock. At least two of the clocked units include multiple register stages, e.g., pipeline stages. A local clock generator in each clocked unit combines the common system clock and stall status from one or more other units to adjust register clock frequency up or down.

31 Claims, 9 Drawing Sheets

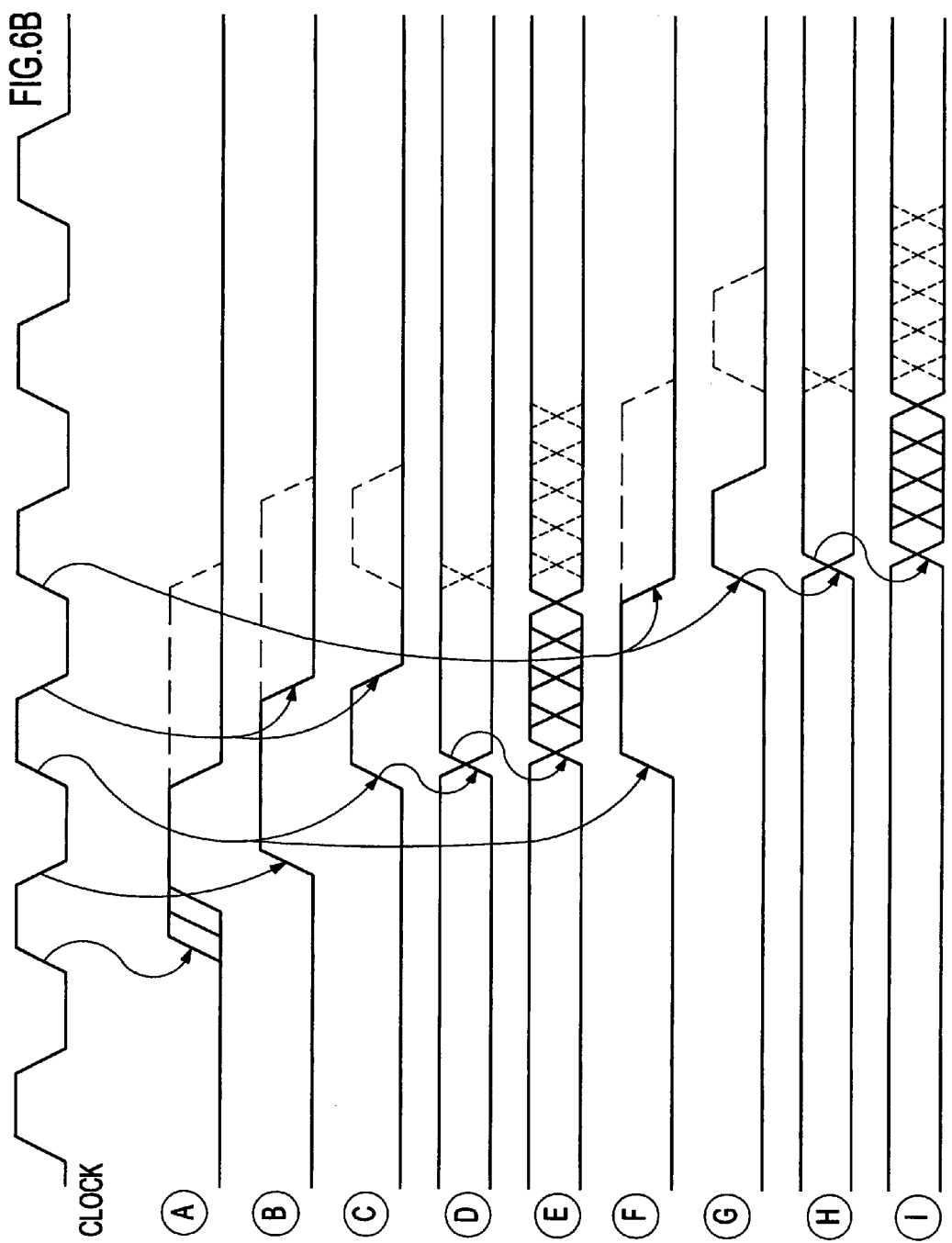

PROCESSOR WITH DEMAND-DRIVEN CLOCK THROTTLING POWER REDUCTION

BACKGROUND OF THE INVENTION

1. Field of the Invention

The present invention generally relates to the reduction and control of power consumption in a microprocessor or system comprised of a plurality of clocked components or units.

2. Description of the Related Art

Semiconductor technology and chip manufacturing advances have resulted in a steady increase of on-chip clock frequencies, the number of transistors on a single chip and the die size itself and a corresponding increase in chip supply voltage. Generally, the power consumed by a given clocked unit increases linearly with the frequency of switching within it Thus, not withstanding the decrease of chip supply voltage, chip power consumption has increased as well. Both at the chip and system levels cooling and packaging costs have escalated as a natural result of this increase in chip power. At the low end for systems (e.g., handhelds, portable and mobile systems), where battery life is crucial, net energy reduction is important, without degrading performance to unacceptable levels. Thus, the increase in microprocessor power dissipation has become a major stumbling block for future performance gains.

A scalar processor fetches and issues/executes one instruction at a time. Each such instruction operates on scalar data operands. Each such operand is a single or atomic data value or number. Pipelining within a scalar processor introduces what is known as concurrency, i.e., processing multiple instructions in a given clock cycle, while preserving the single-issue paradigm.

A superscalar processor can fetch, issue and execute multiple instructions in a given machine cycle. In addition, each instruction fetch, issue and execute path is usually pipelined to enable further concurrency. Examples of super scalar processors include the Power/PowerPC processors from IBM Corporation. The Pentium Pro (P6) processor family from Intel Corporation, the Ultrasparc processors from Sun Microsystems and the PA-RISC processors from Hewlett Packard Company (HP), and the Alpha processor family from the erstwhile Compaq Corporation (now merged with HP).

A vector processor typically is pipelined and can perform one operation on an entire array of numbers in a single architectural step or instruction. For example, a single instruction can add each entry of array A to the corresponding entry of array B and store the result in the corresponding entry of array C. Vector instructions are usually supported as an extension of a base scalar instruction set. Only those code sections that can be vectorized within a larger application are executed on the vector engine. The vector engine can be a single, pipelined execution unit; or, it can be organized as an array or single instruction multiple data (SIMD) machine, with multiple, identical execution units concurrently executing the same instruction on different data. For example, typically, Cray supercomputers are vector processors.

A synchronously clocked processor or system has a single, global master clock driving all the units or components comprising the system. Occasionally, ratioed derivatives of the clock may cycle a particular sub-unit faster or slower than the main or master clock frequency. Normally by design, such clocking decisions are predetermined and preset statically. For example, the Intel Pentium 4 processor clocks its integer pipe twice as fast as the chip master clock, ostensibly using what is known in the art as double-pumping or wave-pipelining. Such clock doubling techniques boost processor execution rates and performance. However, bus and off-chip memory speeds have not kept pace with processor computing logic core. So, most state of the art processors have off-chip buses and caches that operate at frequencies that are integral sub-multiples of the main processor clock frequency. Usually, these clock operating frequencies are fixed during system design. This is the reason current generation processor complexes may have multiple clocking rates. Occasionally, double pumping and wave-pipelining are used in higher end machines to alleviate any performance mismatch between the processor and external buses or memories.

Rabaey, Jan M. and Pedram, Massoud, ed., *Low Power Design Methodologies*, (Kluwer Academic Publishers, 1996) describes power reduction using synchronous clock-gating wherein the clock may be disabled at a point of regeneration, i.e., within a local clock buffer (LCB) feeding a particular chip region, component or latch. At a coarser level of control, clocks are gated along functional boundaries. At a finer level of control, clocks are gated at individual latches. For example, Gerosa et al. "A 2.2 W, 80 MHz, superscalar RISC microprocessor," *IEEE Journal of Solid State Circuits*, vol. 29, no. 12, Dec. 1994, pp. 1440–1454, teaches gating clocks to different execution units based on instructions dispatched and executed in each cycle.

Coarse-grain unit-level clock-gating is beneficial in cases when the processor is executing a sequence of a certain functional class of instructions, e.g., integer-only or floating-point-only instructions. When the input workload is such that the processor sees integer code only, the clock regenerator(s) to the floating point unit may be disabled. Similarly, during the floating-point-only operation, clocks to the integer unit can be disabled. This can save a considerable amount of chip power. Coarse idle control is normally effected locally with software through serial instructions or using hardware to detect idle periods. Fine idle control, normally, is effected also locally during instruction decode by avoiding unnecessarily propagating invalid or inconsequential data. A causal flow of gating-control information from its initial point of origin to downstream stages or units referred to as feed-forward flow. Such a flow path may include loops, with apparent backward flow, but the cause-to-effect information flow is still deemed to be a feed-forward process. Thus, both coarse and fine idle control are self triggered, feed forward.

Using downstream pipeline stall signals to regulate feed-forward flow, on the other hand, constitutes a feedback control system. Here, control information flow is from downstream "effect" to upstream "cause." Coarse and fine grain stall control are used primarily to prevent over-writing of valid, stalled data in the pipelined processor; but such mechanisms can also be used to conserve power consumption. For example, Jacobson et al. "Synchronous interlocked pipelines," IEEE ASYNC-2002 conference, April 2002, propose a fine-grain stall propagation mechanism for reducing power in synchronous pipelines; this complements the more conventional, fine-grain feed-forward mechanism of clock-gating using "valid" bits, as in Gerosa et al. referred to earlier; see also, Gowan et al., "Power considerations in the design of the Alpha 21264 microprocessor," Proc. 1998 ACM/IEEE Design Automation Conference, pp. 726–731 (June 1998). Published fine-grain stall gating (feedback) mechanisms, however, as in Jacobson et al. are not used to control information flow rates (via clock or bus bandwidth throttling) as in our invention.

There are at least two problems arising from coarse idle control that must be addressed. First, large transient current drops and gains can cause unacceptable levels of inductive (Ldi/dt) noise in on-chip supply voltage. Second, overhead cycles are required for gating off and on processes to maintain correct functional operation. Switch between gated and enabled modes too frequently for finer grain phase changes in the workload, results in an unacceptable performance hit.

Further, state of the art fine idle control relies on locally generated gating signals or conditions for pipeline stage-level clock-gating, e.g., based on a data-invalid or inconsequential-operand condition. These state of the art approaches do not generate the gating signal on a predictive or anticipatory basis. So, the timing requirements are often critical because the gating signal must be available in advance of assertion and asserted for a suitable duration for error-free clock-gating operation. Gowan, M. K., Biro, L. L. and Jackson, D. B., "Power considerations in the design of the Alpha 21264 microprocessor," Proc. 1998 *ACM/IEEE Design Automation Conference*, pp. 726–731, (June 1998) discuss how these constraints can significantly complicate design timing analysis, even resulting in a degraded clock-frequency performance.

Whether the basic control mechanism is feed-forward (cause-to-effect flow) or based on feedback (effect-to-cause flow), state of the art clock-gating techniques, whether coarse or fine, also are, spatial control only. This is because, utilization information is used to eliminate redundant clocking in the affected region(s) without regard to temporal activity or history in the region(s) or elsewhere in the machine. Activity states and events in downstream (consumer) units and stages (e.g. execution pipes or issue queues) are not fed back to adjust upstream (producer) clocking or information flow rates in non-adjacent regions (e.g., instruction fetch or dispatch units). Similarly, activity states and events in upstream producer regions are not fed forward to adjust the downstream consumer clocking or information flow rates. Also, gating off clock signals, typically is all or nothing, where the clock signal is either enabled or not.

Thus, there exists a need for improved clock control for connected pipelined units that can operate at a fine-grain spatial and temporal granularity, without incurring a performance (overhead) penalty and without large current/voltage swings to the underlying circuits.

SUMMARY OF THE INVENTION

It is a purpose of the present invention to reduce processor power consumption, without appreciable performance loss.

The present invention is a synchronous integrated circuit such as a scalar processor or superscalar processor. Circuit components or units are clocked by and synchronized to a common system clock. At least two of the clocked units include multiple register stages, e.g., pipeline stages. A local clock generator in each clocked unit combines the common system clock and stall status from one or more other units to adjust register clock frequency up or down.

BRIEF DESCRIPTION OF THE DRAWINGS

The foregoing and other objects, aspects and advantages will be better understood from the following detailed description of illustrative embodiments of the invention with reference to the drawings, in which.

DESCRIPTION OF PREFERRED EMBODIMENTS OF THE INVENTION

Figure 1:
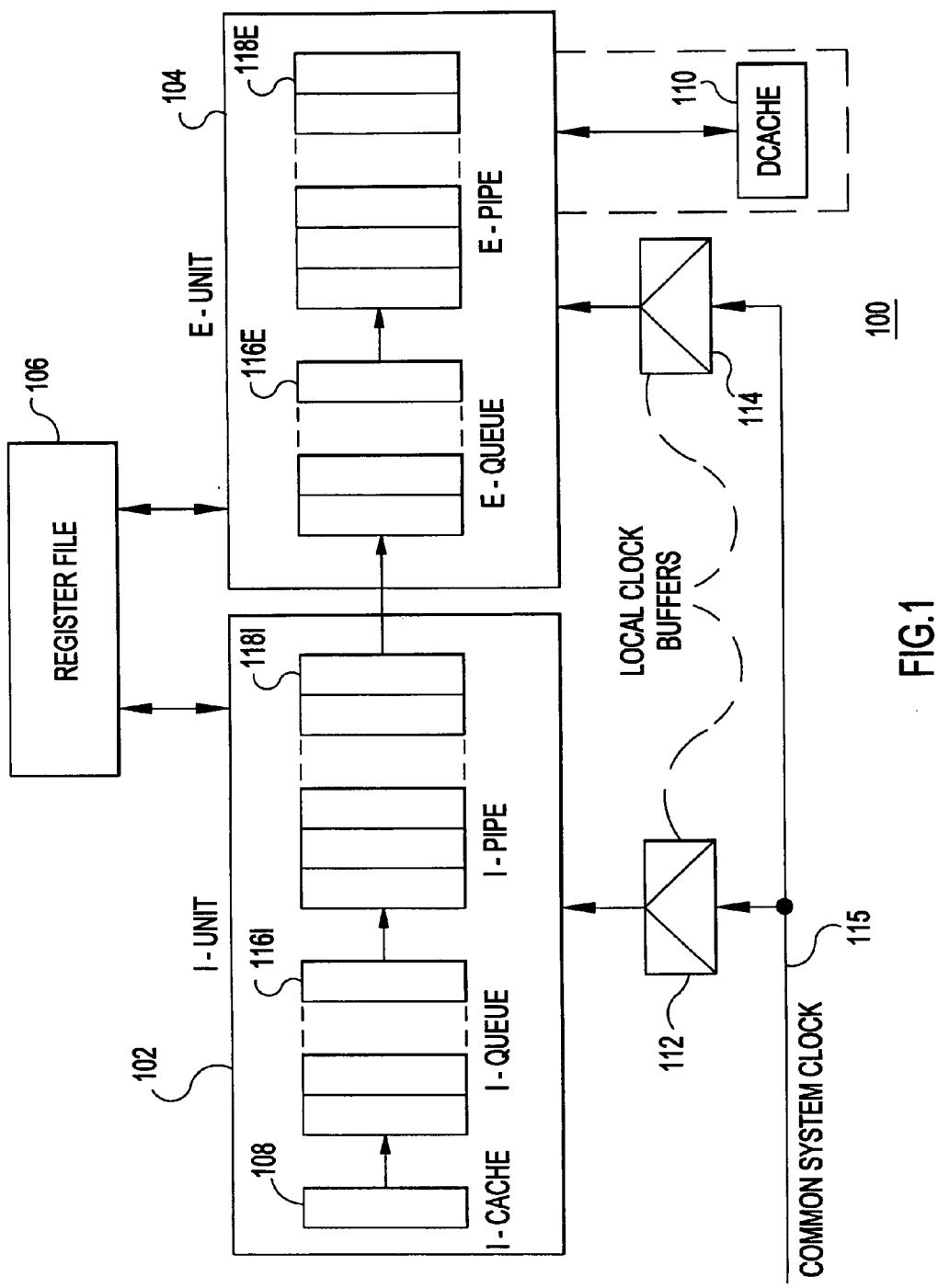
FIG. 1 shows an example of a typical state of the art pipelined scalar processor and a corresponding instruction timing diagram.

Turning now to the drawings and, more particularly, FIG. 1 shows a high level block diagram example of a typical state of the art pipelined scalar processor 100 and a corresponding instruction timing diagram. The main functional data path is divided into two major components or units, normally called the instruction unit (I-UNIT) 102 and the execution unit (E-UNIT) 104. Many detailed sub-units and functional logic, e.g., branch prediction logic, within the I-UNIT 102 and E-UNIT 104 are not germane to discussion of the present invention and so, are omitted for clarity of description of the overall clock control in such a processor 100. The processor 100 of this example is representative of a pipelined scalar design that does not include clock-gating to prevent redundant clocking of units, sub-units or attendant storage resources contained therein.

On-chip storage accessed by one or both units 102, 104 include register file (REGFILE) 106, instruction cache (ICACHE) 108 and data cache (DCACHE) 110. The REGFILE 106 generally is a shared resource that may be accessed from both units 102, 104 and as such, is treated as a separate entity. The ICACHE 108 is the first, terminating stage of the I-UNIT pipe and, as such, is considered part of the I-UNIT 102. The DCACHE 110 is accessible, normally, from the E-UNIT 104 alone, and so, is treated as part of the E-UNIT 104. Two separate local clock buffers (LCBs) 112, 114 each amplify and distribute a common, synchronous clock 115 to a corresponding one of units 102, 104. Each unit 102, 104 includes an input Queue 116I, 116E and a PIPE 118I, 118E. Optionally, within the I-UNIT 102 and E-UNIT 104, there may be a further hierarchy of LCB's 112, 114 for finer grain distribution, amplification and control of the common system clock.

For this example, instructions of a computer program are contained within the ICACHE 108, the first stage of the I-UNIT pipe. Typically, under various conditions that may cause an ICACHE miss, the ICACHE 108 can stall for a variable number of processor cycles. This stall implicitly accommodates for the effects of the miss on preceding instruction transfer stages, i.e., at the lower levels of the instruction memory hierarchy.

The synchronous clock drives each unit continuously through LCBs 112, 114, irrespective of stalls in the pipeline. Switching capacitance modulation and pattern bit variations cause power consumption to vary, albeit within a very small range. As a result, roughly the same amount of energy (represented here in normalized energy units) is spent over each clock period, from the beginning to the end of the program execution. Thus, considerable energy may be saved by application of power saving techniques and especially a power saving method according to the present invention.

Coarse idle control can be synthesized during code generation by the compiler inserting special instructions, included in the instruction set architecture; alternately, these instructions can be issued dynamically by the operating system, e.g., when servicing a special interrupt or at certain context-switch times. At the coarsest control level, a special sleep-type instruction or command can be issued; this special sleep command can generate a disable signal that stops the clock to a selected portion of the chip for a period of time. This same special sleep command can be used to disable the instruction fetch process. Likewise an implicit wakeup begins when the disable signal is negated or after the sleep period; or, the wakeup can be accomplished with an explicit, asynchronous interrupt. As is well known in the art, various power-down modes can be provided (e.g. nap, doze or sleep) with the clock distribution tree selectively disabled at various levels of the LCB hierarchy. At the next finer level of granularity, the compiler can insert special instructions to start gating off the clock(s) to a given unit, e.g. the floating point unit, whenever the compiler can statically predict the computation phases.

A self-detect mechanism may be included, allowing a unit to disable its own clock for a period of time whenever it finds itself to be idle. In hardware the logic can be designed to detect localized idle periods in the processor. Detection can then trigger clock-disabling for some or all of the idling region(s). A wake-up is similarly self-initiated, based on new work received by the disabled or sleeping unit.

For finer idle control, dynamically defined signals gate local clocks cycle-by-cycle. For example, a superscalar machine, the processor determines during instruction decode which functional unit pipes could be clock-gated during the subsequent execute cycles. This works well in a processor with "in-order" issue mechanisms, so that the gating decision can be made unambiguously and sufficiently ahead of time, i.e. at decode or dispatch time. If the instruction class information is preserved in a centralized issue queue on an entry-by-entry basis, then such gating signals can also be generated at issue time even for an out-of-order issue queue.

In any pipelined data path, redundant clocking can be detected dynamically and selectively prevented, e.g., propagating a Data Valid flag or bit along the logic pipeline; this Data Valid flag is set only when the data generated on a cycle is valid. Then, the Data Valid flag for each logic stage can be used as a clock enable for setting the stage's output latches. Thus, invalid data is not unnecessarily clocked through the succeeding pipeline stages in what may be referred to as fine-grain, valid-bit based, pipeline stage-level clock gating.

U.S. Pat. No. 6,247,1342 B1 to Sproch et al., entitled "Method and System for Pipe Stage Gating Within an Operating Pipelined Circuit for Power Savings" Jun. 12, 2001 teaches a processor with logic to identify as inconsequential any newly received operand that would not change in the pipeline in a prior cycle's computation by the first stage of logic. Detection of such an invariance condition signal as inconsequential can be used to disable the clock to the first stage and, then, successively to following stages.

Ohnishi, M., Yamada, A., Noda, H. and Kambe, T. "A Method of Redundant Clocking Detection and Power Reduction at the Rt Level Design," *Proc. Int'l. Symp. On Low Power Electronics and Design (ISLPED)*, 1997, pp. 131–136, discuss other, more elaborate idle detection mechanism to prevent various kinds of redundant latch clocking.

Whether coarse or fine, these state of the art idle control mechanisms are self-triggered, spatial or feed-forward as described hereinabove; i.e., the gating condition or signal is generated locally, based on detection of the unit's idling or invalid status and avoiding unnecessary cycle-by-cycle clock and data propagation in the presence of such invalid or idle status bits. A unit can be an entire region or functional unit; or, it can be a pipeline stage latch-set.

By contrast, in a first embodiment a scalar, pipelined processor with demand driven clock throttling, an instruction unit (I-unit) adjustably operating with an execution unit (E-unit) establish a producer-consumer relationship between the two units. The producer I-unit forwards ready and data-enabled instructions to the execution unit for processing therein at a rate no faster than the execution unit can accept. Each unit maintains an activity status register with at least 1 bit of information. In this embodiment, the I-E unit pair is clocked by a common, synchronous clock. However, the clock for each unit is modified and controlled locally, based on the local unit activity information passed between units. The local clock control for each unit may be a function of activity status information from both the local unit and the remote unit, i.e., both units.

Figure 2:
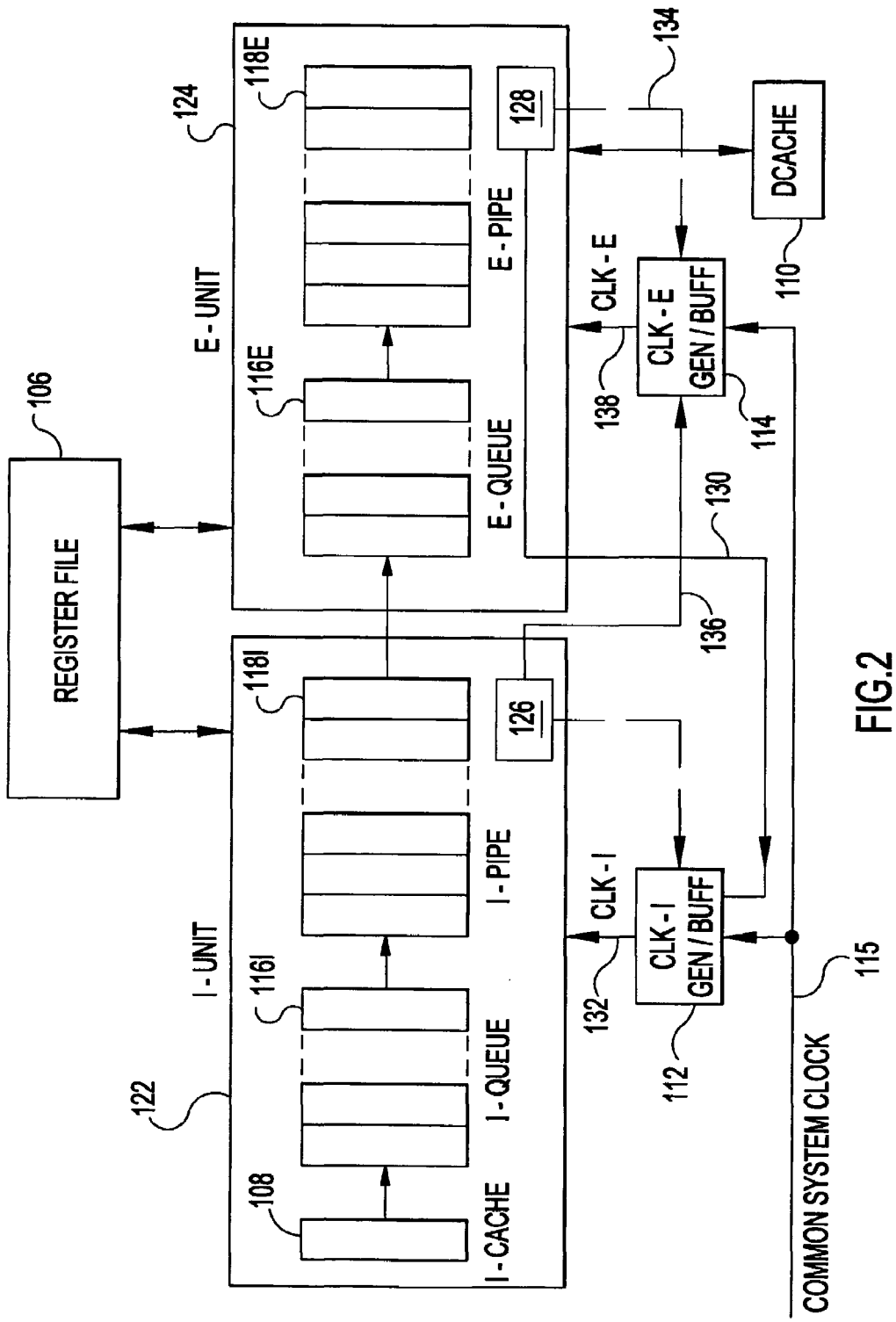
FIG. 2 shows a high-level example of a preferred embodiment demand or activity driven power controlled scalar processor according to the present invention.

FIG. 2 shows a high-level example of a preferred embodiment demand or activity driven power controlled scalar processor 120 according to the present invention with elements identical to those of FIG. 1A labeled identically. In this embodiment each of the processing units 122, 124 include activity monitoring and clock control logic 126, 128 monitoring unit activity level. In a simple embodiment, a single activity status bit 130 is a stall bit signifying a stall/no-stall condition. When the E-unit 124 senses a stall condition (either current or impending), it asserts the stall bit 130. The stall bit 130 is used to adjust down the clock speed of the I-unit clock, CLK-I 132 to throttle down the I unit 122 and effectively, reduce (or cut-off) the instructions rate to the E-unit 124. Depending on the granularity of control, the E-unit activity status or stall bit 130 can adjust its own clock, e.g., 134, within the E-unit 124. When the E-unit 124 stall ends, CLK-I 132 is throttled back up to its normal clock rate. Similarly, when the I-UNIT 122 experiences a stall condition (e.g., an ICACHE 108 miss), a few cycles after which the I-PIPE 118I is empty and so, has nothing for the E-unit 124, an I-PIPE empty bit 136 is used to adjust down CLK-E 138, to conserve power. This throttle up/down capability of the activity monitoring and clock control logic 126, 128 can be implemented using a number of different methods, a few examples of which are provided hereinbelow.

So, for example, each unit's clock may be phased off, one pipeline stage at a time. Similarly, when the gating condition ends, the unit's clock is phased back on, one pipeline stage at a time. The control logic allows a timely phase-out or phase-in of each unit's clock without losing valid information and without adding interface logic, buffering or an energy-wasteful pipeline hold and recirculation. Alternately, the unit's clock frequency may be slowed or stepped down to conserve power. Also, the clock may be slowed to a stop subsequently if/as needed.

Figure 3:
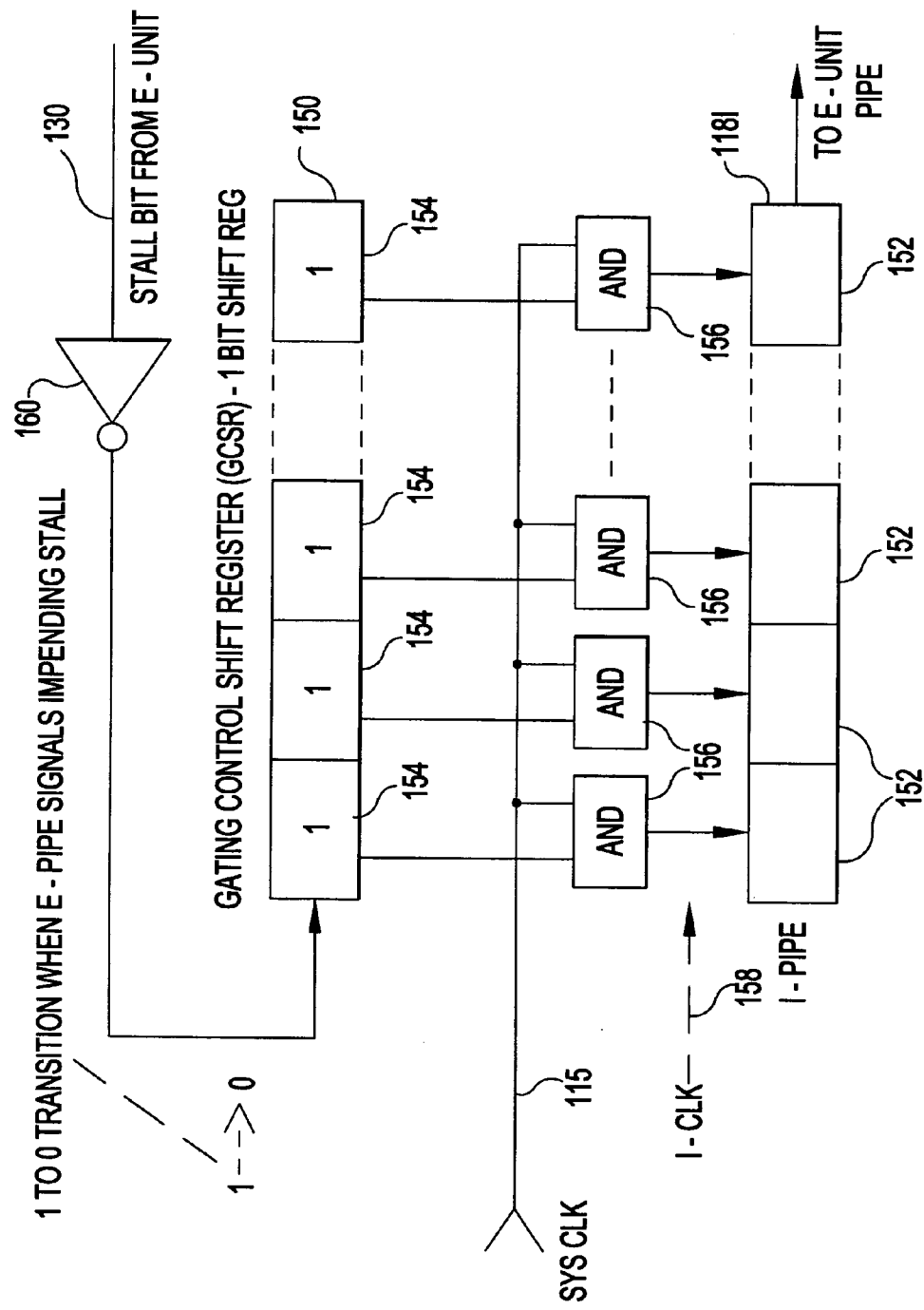
FIG. 3 shows a first example of activity monitoring and clock control logic suspend circuit wherein a gating control shift register (GCSR) enables passing the system clock to individual stages of the I-PIPE.

FIG. 3 shows a first example of activity monitoring and clock control logic suspend circuit wherein a gating control shift register (GCSR) 150 enables passing the system clock 115 to individual stages 152 of the I-PIPE 118I. The GCSR 150 is a 1-bit linear shift register of clocked 1-bit flip-flops 154, one corresponding to each I-PIPE stage 152. The system clock 115 is ANDed at each with each bit of GCSR 150 in one of AND gates 156, selectively passing the system clock 115 as an AND gate output to a corresponding I-PIPE stage 152, collectively as I-CLK 158. Normally in this example, absent detection of an E-unit stall, stall bit 130 remains low and is inverted by inverter 160. With all 1's in the GCSR 150, the I-PIPE 118I is at full-throttle. So, the AND gates 156 pass the system clock 115 unmodified as the I-CLK 158 to each of the I-PIPE stages 152, each identical to the system clock 115. So, long as the E-unit stall bit 130 remains 0, a 1 is shifted into GCSR 150, thereby maintaining the I-PIPE 118I at full throttle.

In this example, when the E-unit activity monitoring and clock control logic (124 and 128 of FIG. 2 respectively) senses an impending stall condition, it asserts the E-unit stall bit 130. The stall bit 130, inverted by inverter 160 presents a 0 to GCSR 150, which is shifted into the GCSR 150 in the next subsequent system clock cycle. At that same cycle, the first I-PIPE stage, i.e., from the ICACHE 116 in FIG. 2, is disabled, halting data input to I-PIPE 118I, while synchronously shifting 0's into and through the GCSR 150. As long as the stall bit 130 is asserted, 0's shift into GCSR 150, one every system clock cycle. Each zero subsequently disables passing the system clock through successive ones of the AND gates 156, rippling from left to right in this example. Thus, one stage of the I-PIPE clock 158 is gated off at a time, from left to right. So, prior to asserting the stall bit 130, valid I-PIPE entries continue through the I-PIPE 118I and into the E-Unit. To avoid losing valid information in the I-PIPE 118I, the E-unit stall bit 130 must be asserted, at least when the available E-unit buffer (queue 116E) space equals the number of valid entries in the I-PIPE 118I. So, the E-unit stall bit 130 must be asserted, at least when the available E-unit buffer (queue 116E) space equals the number of valid entries in the I-PIPE 118I. In the extreme case, the latter simply equals the length of the I-PIPE 118I. Thus, in a conservative design, the E-unit 124 asserts stall bit 130 whenever the E-unit queue 116E fills to an extent that the number of available (free) queue entries equals the number of I-PIPE stages. Empty or invalid entries in the E-unit queue 116E are assumed to be clock-gated using a per-entry valid bit (to save power) as in conventional fine-grain, stage-level clock-gating.

Similarly, when the stall bit 130 returns to 0, i.e., upon detecting that E-unit activity has returned below a pre-determined level, the reverse ramp-up or throttle up operation occurs. The low on the stall bit 130 resumes shifting 1's into GCSR 150 simultaneously with shifting valid input data into the I-PIPE 118I. So, over successive subsequent system clock cycles, the I-CLK 158 is enabled to the I-PIPE 118I, stage-by-stage, so that the I-PIPE 118I resumes normal operation, passing data to the E-unit 124 at full throttle. Gating the I-CLK 158 off/on stage-by-stage prevents large current swings, thereby minimizing the Ldi/dt noise effects on the supply voltage.

Figure 4:
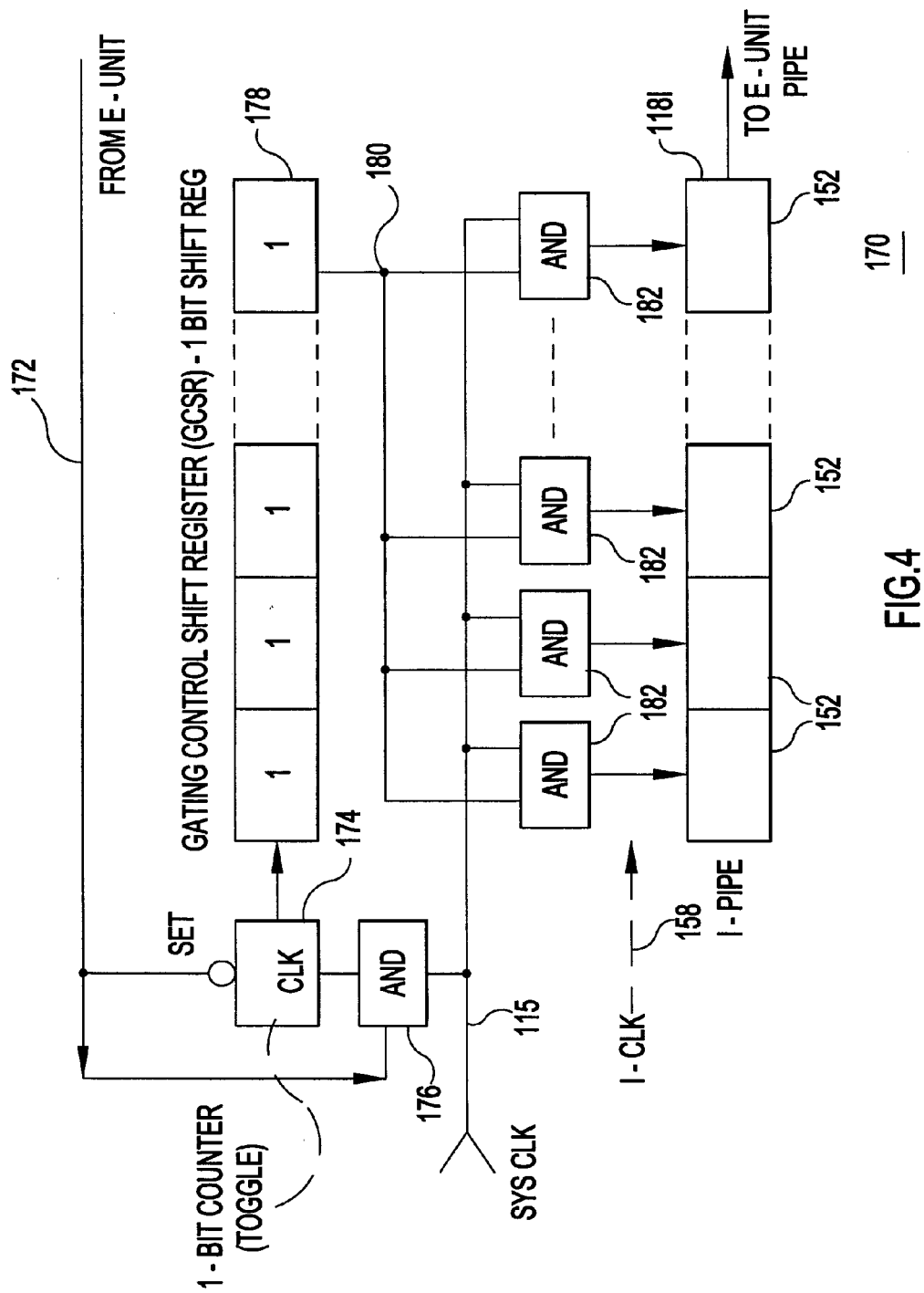
FIG. 4 shows in a second example a slow-down circuit that may be used instead of or included with the suspend circuit of FIG. 3 according to a preferred embodiment of the present invention for on-demand I-CLK throttling.

FIG. 4 shows in a second example a slow down circuit 170 that may be used instead of or included with the suspend circuit of FIG. 3 according to a preferred embodiment of the present invention for on-demand I-CLK throttling. The slow down circuit 170 is substantially similar to the suspend circuit of FIG. 3 with shared or common elements labeled identically. A slow select 172 is provided to both an inverted set input of flip flop/1-bit toggle counter 174 and to AND gate 176. AND gate 176 selectively passes system clock 115 to clock 1-bit counter 174 when slow select bit 172 is high, i.e., asserted. Slow select GCSR 178 is substantially similar to GCSR 150 of FIG. 3, except that only the final stage output 180 is passed to all AND gates 182. AND gates 182 may be three input AND gates, providing the suspend select function of AND gates 156 of FIG. 3. Thus, AND gates 182 may combine the final stage output 180 with system clock 115 and a corresponding stage output from GCSR (130 of FIG. 3 not shown in this example). Individual outputs of AND gates 182 clock corresponding I-PIPE 118I stages.

In this embodiment, the clock frequency of the I-unit can be throttled down (up) in response to slow select 172. The E-unit alerts the I-unit of slowing (increasing) demand in the E-unit by asserting (de-asserting) the slow select 172. In addition, the above described feature of suspending the I-CLK 158 completely, for one or more cycles may be retained; as described above with reference to FIG. 3, a suspend is triggered when the E-unit queue is almost full, thus providing disable outputs from GCSR 150 to corresponding individual AND gates 182. The I-CLK 158 re-starts when the E-unit active queue length reduces below a pre-determined threshold, as above.

Under normal operating conditions, slow select 172 is low ('0'), causing the 1-bit control counter to output a continuous high shifts into the GCSR 178. So, normally the GCSR 178 contains all 1's and the system clock 115 passes unmodified to the I-PIPE stages 152. The AND gate 176 prevents the 1-bit control counter 174 from toggling when slow select 172 is asserted to signal a demand slow-down in the E-unit, e.g., due to stalls. The 1-bit control counter 174 is released when the slow select 174 to its inverted set input rises and, AND gate 176 passes system clock 115. The 1 bit control counter 174 begins to toggle passing an alternating sequence of 0's and 1's to GCSR 178. Once this alternating pattern propagates through GCSR 178, the I-CLK control to AND gates 182 is enabled and disabled on alternate clock cycles. Effectively, this halves the main system clock frequency, which is provided as the I-CLK 158.

Figure 5:
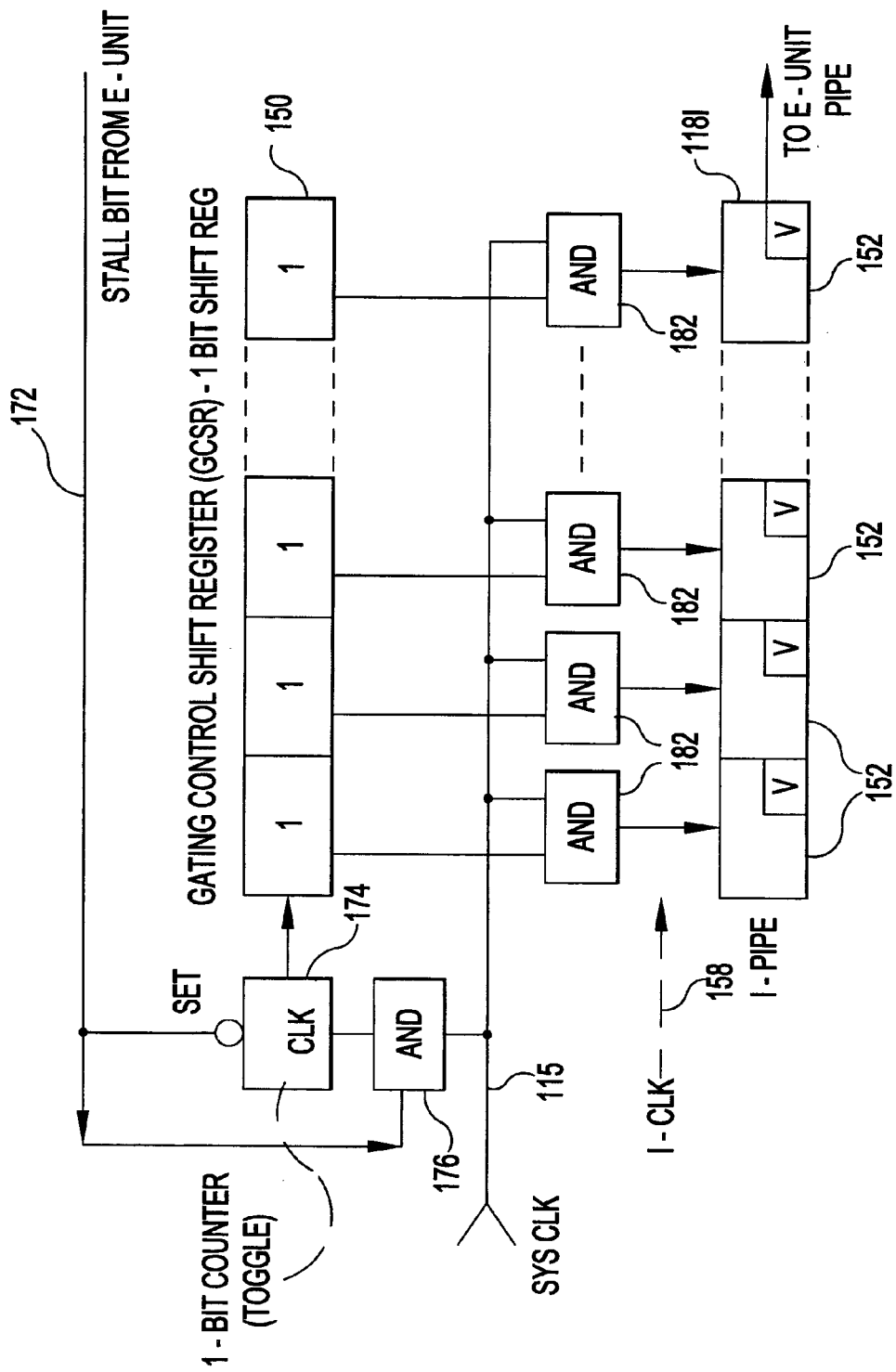
FIG. 5 shows a variation of the embodiment of FIGS. 3 and 4 wherein individual GCSR stage outputs are passed to corresponding individual AND gates.

FIG. 5 shows a variation of the embodiment of FIGS. 3 and 4 wherein individual GCSR stage outputs are passed to corresponding individual AND gates 182. Operation is substantially similar to FIG. 4, but may differ in the final I-PIPE clock throttling. During the throttle (speed-down) phase, under steady-state operation, alternate stages of I-PIPE are clocked on a given system clock cycle, effectively at half the system clock frequency. A valid bit (V) is indicated within each I-PIPE stage for example only. Such valid bits are normally present in the I-PIPE, E-PIPE, I-QUEUE and E-QUEUE structures of the examples of FIGS. 1–5. Upstream I-UNIT valid bits are propagated downstream into the E-UNIT, to enable fine-grain, stage-level clock-gating to save additional power in accordance with conventional feed-forward schemes. In this example the valid bit per pipeline stage provides an additional gating control for the AND structure that synthesizes the local stage-level clock. The particular I-PIPE clocking arrangement of this embodiment requires underlying circuitry (not shown) to prevent over-writing valid data in the I-PIPE stages during the throttle (speed-down) mode, e.g., spare intermediate place-holder latches between stages or, master and slave portions of each latch stage may double the information storage.

Figure 6A:
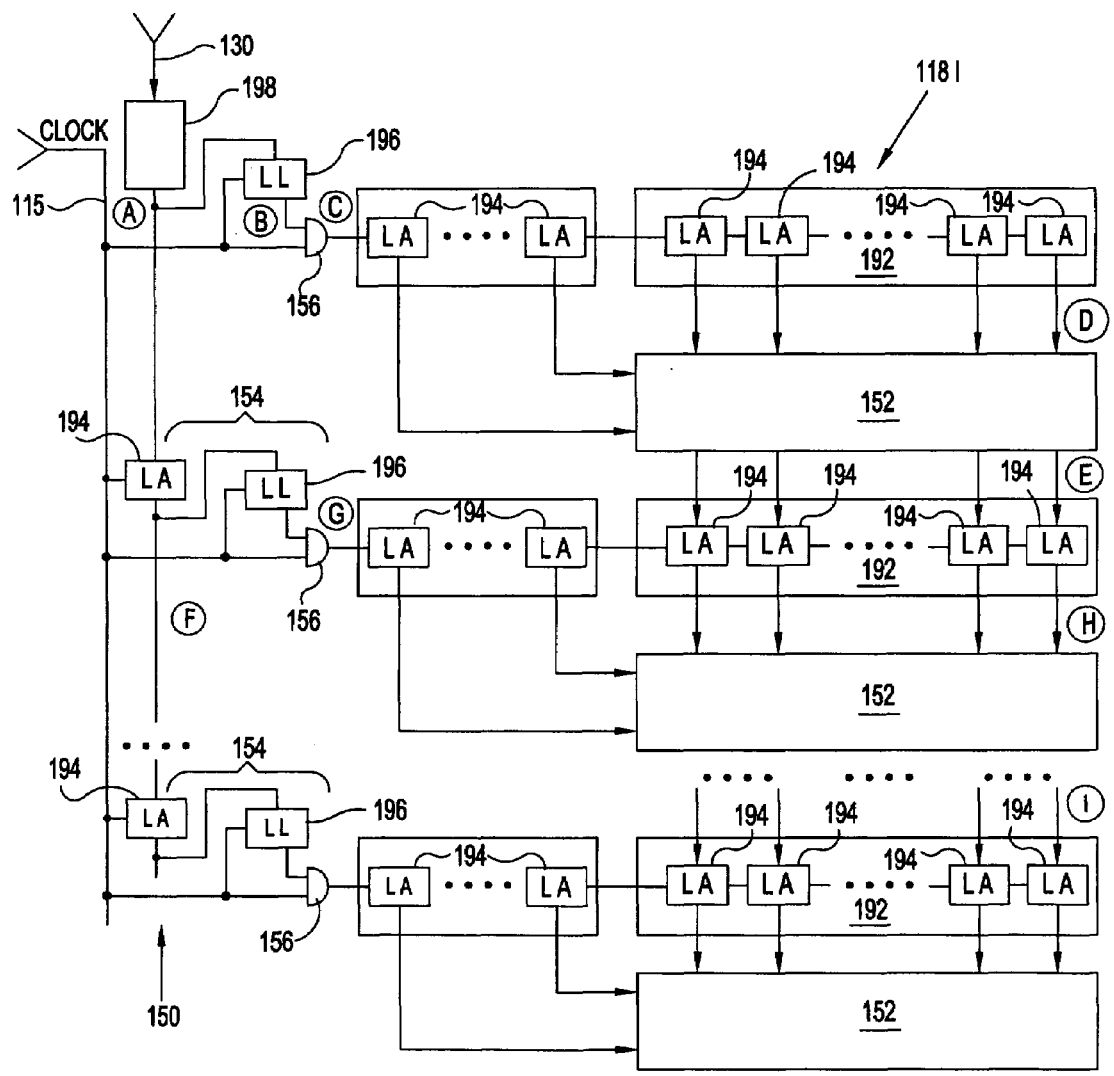
FIG. 6 shows a further example of a scalar I-pipe corresponding to the cross section of FIG. 3 in further detail.

FIGS. 6A–B shows a further example 190 of a scalar I-pipe 118I corresponding to the cross section of FIG. 3 in further detail and a corresponding timing diagram. Each I-pipe stage 152 is bracketed on input and output by a register stage 192. In this example, each of the GCSR latches 154 is a two stage latch and a single bit of, essentially, a serial-in/parallel-out register. The two stage latches 154 include a first stage latch 194 and a second stage latch 196. The first stage latch 194 is identical to the latches in the register stages 192. The second stage latch 196 is enabled using the negative clock polarity from that for the first stage latch 194. Thus, for example with the first stage latches 194 being clocked on a rising clock edge, the second stage latches 196 are clocked on the falling clock edge to ensure that a valid input is provided to I-clock drivers 156. As described with reference to FIGS. 3–5 and here in FIG. 6, I-clock drivers 156 are AND gates and function as AND gates. However, each of AND gates 156 may include a clock driver that may be a dual phase clock driver, if desired. Input blocks 198 provide the appropriate clock control logic for the particular type of selected suspend/slow control logic. Thus, in the example of FIG. 3, input block 198 would include invertor 160, as well as a first stage 194 of the latch 154 for this first stage of GCSR 150. Likewise, for the examples of FIGS. 4 and 5, input block 130 would include latch 174 and AND gate 176.

Figure 7:
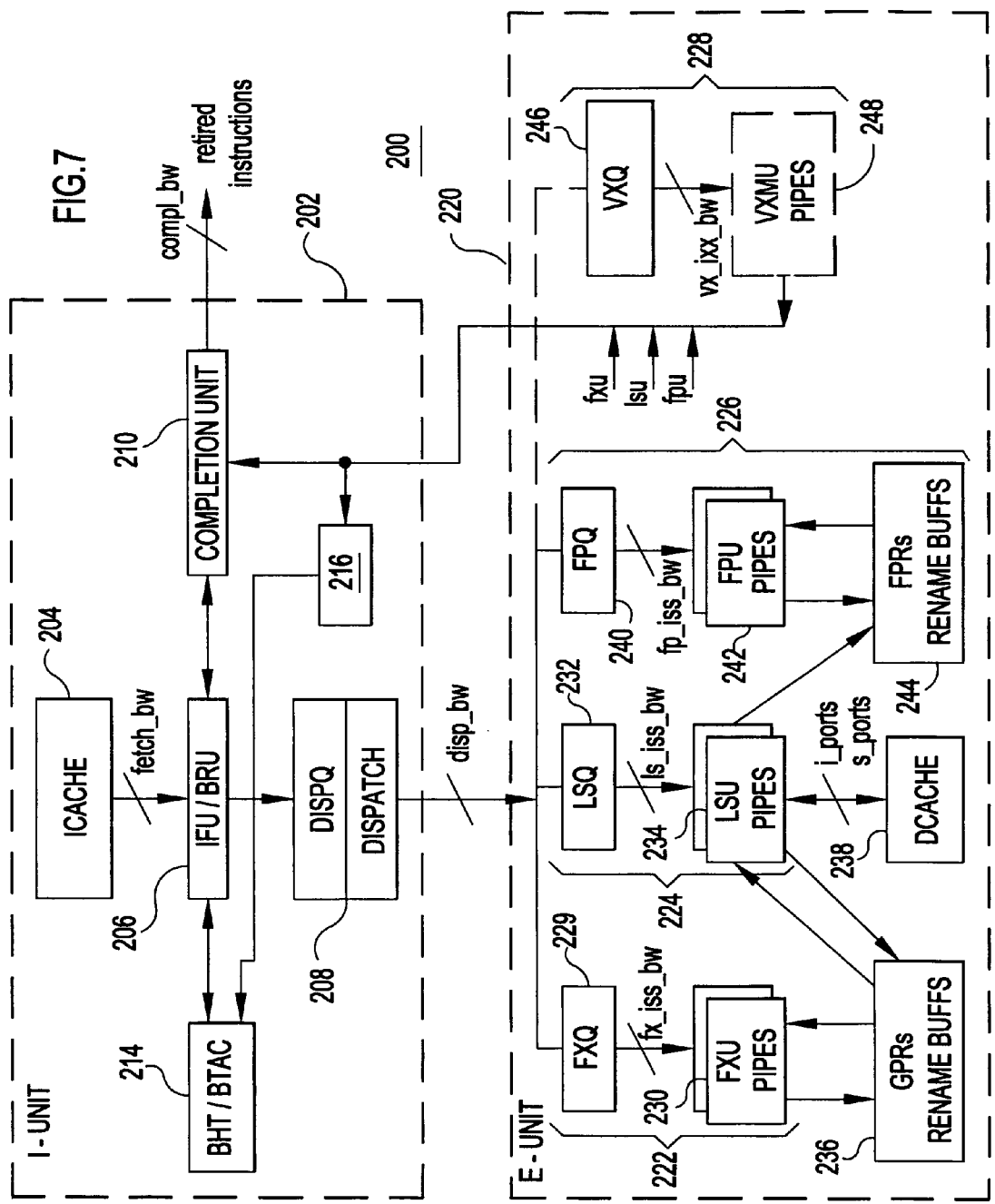
FIG. 7 shows an example of application of the present invention to a pipeline superscalar processor.

FIG. 7 shows an example of application the present invention to a pipeline super scalar processor 200. This super scalar processor 200 includes an I-unit 202 and an E-unit 220. The I-unit 202 includes an instruction cache (ICACHE) 204, a combined IFU/BRU (206) that includes both an instruction fetch unit (IFU) and a branch unit (BRU), a dispatch unit (DPU) 208, a completion unit (CMU) 210 and a branch address unit 214 that includes a branch history table (BHT) and a branch target address cache (BTAC). In addition, I-unit 202 includes monitoring and clock control logic 216. These units 204, 206, 208, 210 and 214 operate substantially identical to corresponding well known such units, but are clocked according to the present invention by monitoring and clock control logic 216 and as set forth hereinbelow.

Normally, the IFU in IFU/BRU 206 fetches instructions from ICACHE 204 every cycle. The fetch bandwidth (fetch_bw), which in prior art processors is fixed as the maximum number of instructions fetched per cycle, can be adjusted on the fly by monitoring and control logic 216. The IFU places fetched instructions in the fetch queue (FETCH_Q) in IFU/BRU 206, subject to available free space. The instruction fetch address register (IFAR) in the IFU guides the instruction fetch and provides a next fetch address at the beginning of every cycle. The IFU sets each next fetch address for each cycle to one of: (a) the next sequential address which is the previous cycle's IFAR value, incremented sufficiently to account for the number of instructions that were fetched into the FETCH_Q in the previous cycle; (b) a branch instruction target resolved or predicted to be taken in the previous cycle; or (c) the correctly resolved fetch address of a branch instruction, after it has been determined that it was previously mispredicted. The branch and instruction fetch address prediction hardware 206 includes the branch history table (BHT) and the branch target address cache (BTAC) and guides the instruction fetch process. A fixed number of instructions are normally fetched (or dispatched) in each active fetch (or dispatch) cycle, as determined by the corresponding, fixed bandwidth parameter (fetch_bw or disp_bw). However, when the E-unit 220 indicates a slow down/suspend is necessary, the preferred embodiment processor (200 in this example) dynamically adjusts the values of each of fetch_bw and/or disp_bw in addition to the above described clock-throttling.

The slow-down/suspend (or its converse speed-up/continue) signal from the E-UNIT is synthesized as a combinatorial function of status signals generated and monitored within the E-UNIT. Such status signals may include: (a) an indication of the fullness or emptiness of the issue queues FXQ 229, LSQ 232, FPQ 240 and VXQ 246; (b) a DCACHE 238 hit or miss event; (c) E-UNIT internal shared bus traffic congestion or lack thereof (e.g., a single bus may be shared (and arbitrated) to carry finish information to the completion unit 240); or, (d) an execute pipe flush or re-issue condition has been generated due to branch mispredicts or other forms of mis-speculations. Processor Branch instructions may be executed in the FXU pipes in this example. Alternately, however, a separate, concurrent BRU pipe may be present to execute branch instructions.

Asserting the slow-down/suspend signal from the E-UNIT throttles the I-UNIT pipeline flow rate by one or both of I-CLK throttling and/or constricting relevant I-UNIT bus bandwidths without adjusting the clock, e.g., on a given access fetch_bw can be effectively halved, by disabling half of the lines that receive fetched data from the ICACHE. Thus, to save power in throttled bandwidth mode, half the normal number of entries are in the instruction buffer (within IFU 206). In general, the fetch bandwidth may be throttled to any fraction of the normal mode, including all the way to zero, depending upon the indicated severity of the downstream E-UNIT slow-down/suspend. Similarly, the dispatch bus bandwidth (disp_bw) can be throttled to save power, to dispatch fewer instructions to the consuming E-UNIT execute pipes as needed or indicated.

E-unit 220 includes a fixed point execution unit (FXU) 222, a load store unit (LSU) 224, a floating point execution unit (FPU) 226 and a vector multimedia extension unit (VMXU) 228. The FXU 222 includes a fixed point queue 229 and a fixed point unit execution unit pipe 230. The LSU 224 includes a load store queue 232 and a load store unit pipe 234. Both the FXU 222 and the LSU 224 communicate with general purpose registers 236. The LSU 224 provides communication with data cache 238. The FPU 226 includes a fixed point queue 240 and fixed point unit pipe 242, as well as fixed point registers and rename buffers 244. The LSU 224 also communicates with the fixed point rename buffers 244. The VMXU 228 includes a vector extension queue 246 and a vector multimedia extension unit pipe 248.

Each of units 229, 230, 232, 234, 236, 238, 240, 242, 246, 248 operate substantially identical to corresponding well known such units, but clocked according to the present invention as described hereinbelow. As with any typical state of the art superscalar processor, activity in the FXU 222 and FPU 226 may quite often may be mutually exclusive during a given workload execution phase. This preferred embodiment processor 200 can disable or slow down the FXU 222 local clock when the FPU 226 is active and vice versa. Additionally, this preferred embodiment processor 200 allows the LSU 224 and FPU 226 to suspend/slow clocking speeds in each other. These intra-unit, finer-grain demand-driven clock-throttling modes are in addition to the inter-unit coarser grain modes already described.

Unlike the preferred scalar processor example hereinabove, these two units 224, 226 in the E-unit 220 do not have a direct dataflow path producer-consumer relationship, i.e., a direct flow of information does not exist between the LSU 224 and the FPU 226. Communication between these two units 224, 226 occurs indirectly via the data cache/memory and the floating point register file 244. Typically, a FPU pipeline 242 has several stages (e.g., 6–8 in modern gigahertz range processors) while a typical LSU execution pipe 234 is 2–4 stages. For this reason and since current processors have a large number of register rename buffers, the LSU pipe 234 tends to run substantially ahead of the FPU pipe 242 during a DCACHE 238 hit phase. On the other hand, during a clustered DCACHE 238 miss phase, the effective LSU path latency can increase dramatically. If a series of quick misses stalls the DCACHE 238, the LSU issue queue 232 fills up, which may in turn stall upstream producers. This is exploited by the present invention using activity-driven fine-grain temporal clock-gating of upstream resources or local clock throttling of the FPU 226.

Figure 8:
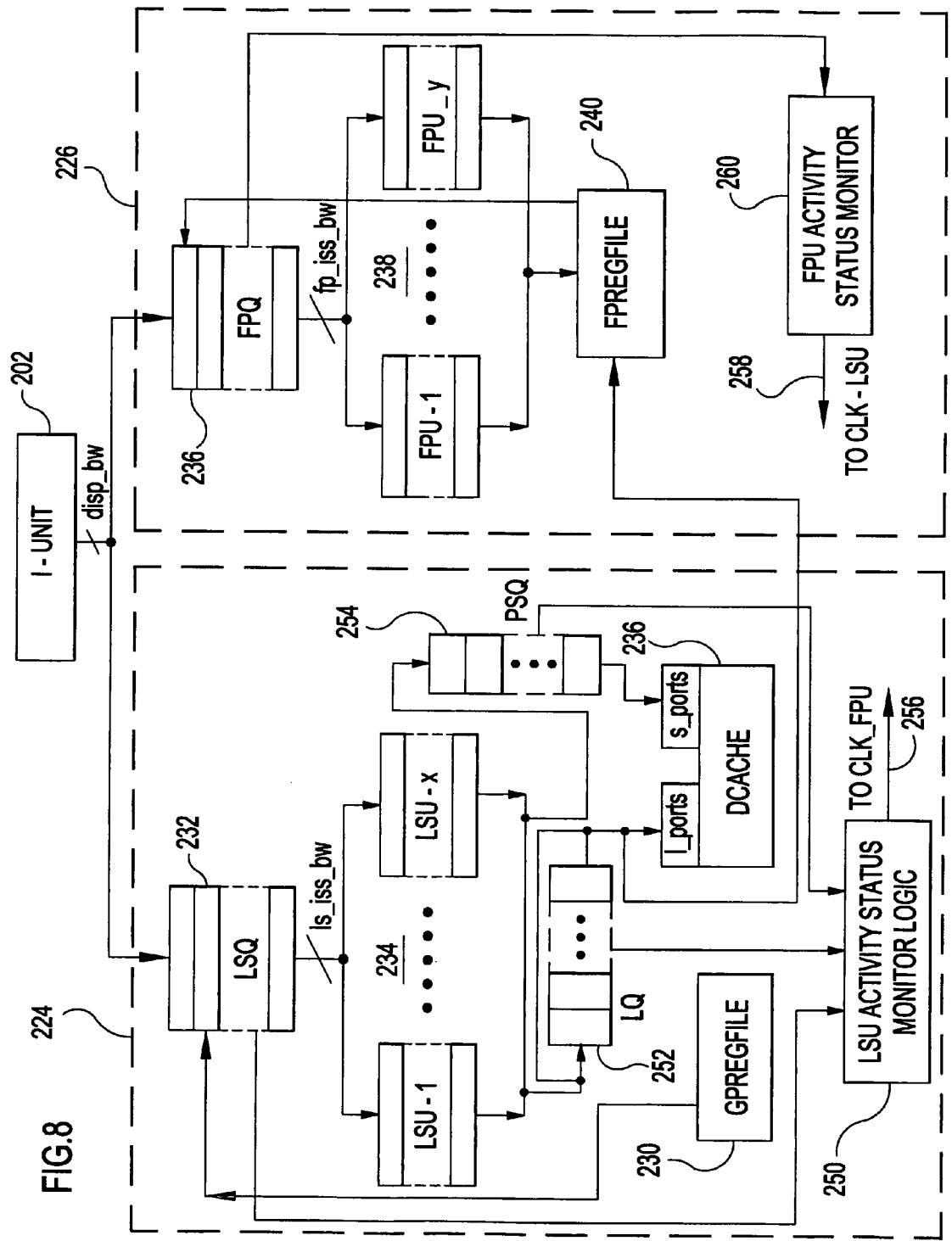
FIG. 8 shows a more detailed example of LSU and FPU of the E-UNIT as in FIG. 7.

FIG. 8 shows a more detailed example of LSU 224 and FPU 226 of the E-UNIT 200. In this embodiment, the LSU event/activity status monitor logic 250 monitors utilization of various LSU queues and derives an activity state for the LSU 226. In this example, the LSU queues include a load-store issue queue (LSQ) 232, a pending load queue (PLQ) 252 and a pending store queue (PSQ) 254, as well as the DCACHE 236. DCACHE 236 is monitored and cache "miss" events are recorded. It is understood that these four units 232, 236, 252, 254 are selected for example only and fewer or more queues and events may be monitored. For this example, the LSU event/activity status monitor logic 250 asserts an output stall bit 256 that is passed to the FPU 226 in this example. A set of stall bits may be used if finer control is desired. The stall bit 256 may be passed for control to the I-UNIT 202 and to clock control for the IFU or DISPATCH unit 206.

As an example, initially with both the LSU activity status monitor logic output stall bit 256 and the output 258 of FPU activity status monitor stall 260 are de-asserted, causing normal full-throttle operation in both LSU 224 and FPU 226. If the FPU activity status monitor stall bit 258 is asserted while the LSU activity status stall bit 256 remains unasserted, e.g., due to high utilization within the FPQ. The LSU local clock is throttled down to allow the FPU 226 to catch up with the LSU 224, which is ahead of the FPU 226, due to a cache hit phase. Conversely, when the LSU activity status stall bit 256 is asserted, while the FPU activity status stall bit 258 remains unasserted, the FPU local clock is throttled down. If both LSU and FPU stall bits are asserted/deasserted together, both LSU and FPU local clocks get throttled down or sped up to the same frequency, depending on other status conditions elsewhere in the E-UNIT 220 or I-UNIT 202.

Advantageously, the present invention selectively slows down, speeds up or gates off a unit or a component within a unit, in response to activity/inactivity in other processor or system units, i.e., the present invention has variable clock control granularity. Each unit's local clock control is derived from activity and information that flows both forward and backward in relation to data flow direction. Instead of all-or-nothing prior art clock-gating, the preferred embodiment adaptive clocking can use both feed-forward and feedback control to provide a more flexible generalized clock-throttling mechanism with optional bandwidth throttling.

Thus, pending information, that might be lost in gating off a prior art pipeline unit, is maintained current with proper sizing in unit queues. The units are dynamically controlled by information pertaining to activities within the various units. The clock rate in a given component is adjusted downward or even reduced to zero in a phased manner, in response to activity level(s) in other units that indicate a reduction of demand. When monitored activity levels indicate unit demand has returned to normal, the clock rate in the particular component is restored to its original normal level, again in a phased manner. During periods when the local clock rate is adjusted downwards in one or more components, net system power consumption is reduced proportionately. Each component's clock rate is adjusted in a timely and anticipatory manner, such that hardware control effecting the rate changes does not result in any appreciable performance loss, e.g., from overhead stalls or recomputing discarded instructions. The performance penalty incurred from such a loss in a prior art processor is reduced almost to zero.

The phased manner of clock speed throttling to adjust frequency down or up, ensures superior (i.e., more benign) current swing (di/dt) characteristics, compared with conventional clock-gating methods. So, inductive noise is minimized by the phased reduction or increase of clocking rates. As a result, a preferred embodiment system consumes significantly less power, without appreciable performance loss. Average power is reduced without appreciable (architectural) performance loss (e.g., instructions per cycle or IPC) and without requiring significant additional hardware. Where strict adherence to maximum power dissipation and temperature limits is required, the present invention successfully controls power consumption while limiting performance loss to a small, pre-determined time window to maintain normal operating conditions and for a quick return to normal.

Dynamic activity levels of individual system components are monitored with the clock rate to other components within the framework of a single, synchronous clock that is propagated throughout the chip or system. Further, unlike synchronous systems or processors with locally-clocked, asynchronous (or self-timed) units or, multi-clock synchronous systems with multiple, synchronous clock domains under globally asynchronous control, the present invention does not require "handshaking" protocol between separately clocked components to maintain synchronization. Additionally, the present invention dynamically adjusts clocking rates in various components minimize inductive noise problems that are normally associated with conventional coarse-grain clock-gating methods.

While the invention has been described in terms of several (example) preferred embodiments, those skilled in the art will recognize that the invention can be practiced with modification within the spirit and scope of the appended claims.

We claim:

1. A synchronous integrated circuit comprising:
   a common system clock; and
   a plurality of clocked units synchronized to said common system clock, at least two of said clocked units each comprising:
   a plurality of register stages, and
   a local clock generator, comprising a gating control shift register (GCSR) including a plurality of single bit counters, said local clock generator receiving said common system clock and stall status and adjusting clocking frequency of said plurality of registers responsive to said stall status.

2. A synchronous integrated circuit as in claim 1, said local clock generators further comprising a plurality of local clock drivers each receiving an output from one of said plurality of single bit counters and combining said output with said system clock to generate a register stage clock.

3. A synchronous integrated circuit as in claim 2, wherein said plurality of register stages are stages of a register pipeline and said GCSR includes one of said plurality of single bit counters for each pipeline stage.

4. A synchronous integrated circuit as in claim 3 wherein said integrated circuit is a scalar processor and at least two clocked units comprise an I-unit and an E-unit in said scalar processor, said I-unit providing stall status to said E-unit and said E-unit providing stall status to said I-unit.

5. A synchronous integrated circuit as in claim 4, said scalar processor further comprising:
   a data cache communicating with said E-umit;
   a register file communicating with said I-unit and said E-unit;
   said I-unit comprising an I-cache, an I-queue receiving data from said I-cache and an I-pipe receiving data from said I-queue; and
   said E-unit comprising an E-queue receiving data from said I-pipe and an E-pipe receiving data from said E-queue.

6. A synchronous integrated circuit as in claim 5 wherein in each of said I-unit and said E-unit, each output of a respective said GCSR is combined with said system clock at a corresponding one of said plurality of clock drivers, each of said plurality of clock drivers individually gating a corresponding pipeline stage.

7. A synchronous integrated circuit as in claim 6 wherein a stall status bit is provided to a first stage of said GCSR.

8. A synchronous integrated circuit as in claim 6 wherein a stall status bit is provided to a one bit counter, said one bit counter being held set unless said stall status bit is asserted and counting when said stall status bit is asserted, an output of said one bit counter being provided to a first stage of said GCSR.

9. A synchronous integrated circuit as in claim 5 wherein a last output of said GCSR is combined with said system clock in each of said plurality of clock drivers, a stall status bit is provided to a one bit counter, said one bit counter being held set unless said stall status bit is asserted and counting when said stall status bit is asserted, an output of said one bit counter being provided to a first stage of said GCSR.

10. An integrated circuit as in claim 4 wherein said scalar processor is a superscalar processor, said I-unit further adjusting an I-cache fetch bandwidth responsive to said stall status bit from said E-unit.

11. A synchronous integrated circuit as in claim 10 wherein said E-unit comprises:
    a fixed point unit receiving instructions from said I-unit and communicating with a general purpose register/rename buffer unit;
    a load store unit receiving instructions from said I-unit and communicating with said general purpose register/rename buffer unit and a data cache;
    a floating point unit receiving instructions from said I-unit and conununicating with a floating point register/rename buffer unit, said load store unit further communicating with said floating point register/rename buffer unit, said load store unit providing stall status to said floating point unit and said floating point unit providing stall status to said load store unit; and
    a vector multi-media extension unit receiving instructions from said I-unit and communicating with a completion unit in said I-unit.

12. A synchronous integrated circuit as in claim 10 wherein said I-unit further comprises:
    an I-cache;
    an instruction fetch unit/branch unit (IFU/BRU) receiving instructions from said I-cache; and
    a dispatch unit receiving instructions from said IFU/BRU and providing received said instructions to said E-unit.

13. A synchronous integrated circuit as in claim 11 wherein an output from each stage of each said GCSR is combined with said system, clock and individually gates a corresponding pipeline stage.

14. A synchronous integrated circuit as in claim 13 wherein a stall status bit is provided to a first stage of said GCSR.

15. A synchronous integrated circuit as in claim 13 wherein at each said GCSR, a stall status bit is provided to a one bit counter, said one bit counter being held set unless said stall status bit is asserted and counting when said stall status bit is asserted, an output of said one bit counter being provided to a first stage of said each GCSR.

16. A synchronous integrated circuit as in claim 13 wherein a last output of said GCSR is combined with said system clock in each of said plurality of clock drivers, a stall status bit is provided to a one bit counter, said one bit counter being held set unless said stall status bit is asserted and counting when said stall status bit is asserted, an output of said one bit counter being provided to a first stage of said GCSR.

17. A scalar processor comprising:
    a common system clock;
    an 1-unit clocked by said system clock; and
    an E-unit clocked by said system clock and in communication with said I-unit;
    each of said I-unit and said E-unit comprising:
        a plurality of register stages, and
        a local clock generator comprising:
            a gating control shift register (GCSR) including a plurality of single bit counters, and
            a plurality of local clock drivers each receiving an output from one of said plurality of single bit counters and combining said output with said common system clock to generate a register stage clock, said local clock generator receiving stall status and adjusting clocking frequency of said register stage clock to each of said plurality of registers responsive to said stall status, said I-unit providing stall status to said E-unit and said E-unit providing stall status to said I-unit.

18. A scalar processor as in claim 17, wherein said plurality of register stages are stages of a register pipeline and said GCSR includes one single bit counter for each pipeline stage.

19. A scalar processor as in claim 18 further comprising:
    a data cache communicating with said E-unit;
    a register file communicating with said I-unit and said E-unit; and
    said I-unit comprising an I-cache, an I-queue receiving data from said I-cache and an I-pipe receiving data from said I-queue; and
    said E-unit comprising an E-queue receiving data from said I-pipe and an E-pipe receiving data from said E-queue.

20. A scalar processor as in claim 19 wherein each of said I-unit and said E-unit combines an output of said GCSR with said system clock at a corresponding one of said plurality of clock drivers, each of said plurality of clock drivers individually gating a corresponding pipeline stage.

21. A scalar processor as in claim 20 wherein a stall status bit is provided to a first stage of said GCSR.

22. A scalar processor as in claim 20 wherein a stall status bit is provided to a one bit counter, said one bit counter being held set unless said stall status bit is asserted and counting when said stall status bit is asserted, an output of said one bit counter being provided to a first stage of said GCSR.

23. A scalar processor as in claim 19 wherein a last output of said GCSR is combined with said system clock in each of said plurality of clock drivers, a stall status bit is provided to a one bit counter, said one counter being held set unless said stall status bit is asserted, and counting when said stall status bit is asserted, an output of said one bit counter being provided to a first stage of said GCSR.

24. A superscalar processor comprising:
a common system clock;
an I-unit clocked by said system clock, said I-unit comprising:
   an 1-cache,
   an instruction fetch unit/brancb unit (IFU/BRU) receiving instructions from said I-cache, and
   a dispatch unit receiving instructions from said IFU/BRU and forwarding received said instructions for execution;
an E-unit clocked by said system clock, said E-unit comprising:
   a fixed point unit receiving instructions from said I-unit and communicating with a general purpose register/rename buffer unit,
   a load store unit (LSU) receiving instructions from said I-unit and communicating with said general purpose register/rename buffer unit and a data cache,
   a floating point unit (FPU) receiving instructions from said I-unit and communicating with a floating point register/rename buffer unit, said load store unit further communicating with said floating point register/rename buffer unit, said load store unit providing stall status to said floating point unit and said floating point unit providing stall status to said load store unit, and
   a. vector multi-media extension unit receiving instructions from said I-unit and communicating with a completion unit in said I-unit; and
   a local clock generator in each of said LSU and said FPU receiving said common system clock and stall status and adjusting clocking frequency of unit registers responsive to said stall status.

25. A superscalar processor as in claim 24 wherein said stall status indicates a unit level of activity.

26. A superscalar processor as in claim 25 wherein said I-unit adjusts fetch bandwidth responsive to E-unit stall status.

27. A method controlling local frequency of local clocks to integrated circuit chip components, said method comprising:
monitoring chip component activity level; and
adjusting the local frequency clock of a first component responsive to an indication that an activity level in a second component is beyond a threshold level, wherein a local clock generator configured to generate the local frequency clock comprises a gating control shift register including a plurality of single bit counters.

28. A method as in claim 27 wherein when said activity level in said second component has risen above said threshold level, said local clock is paused.

29. A method as in claim 27 wherein when said activity level in said second component has risen above said threshold level, said clock frequency is halved.

30. A method as in claim 29 wherein when said activity level has risen above a second threshold level, said clock is paused.

31. A method as in claim 27 wherein when said activity level falls below said threshold level, said local clock is returned to a normal operating frequency.

* * * * *